United States Patent [19]

Arash

[11] Patent Number: 4,824,376
[45] Date of Patent: Apr. 25, 1989

[54] EDUCATIONAL DEVICE

[76] Inventor: Ahmad R. Arash, 1 Howe St., Ipswich, Mass. 01938

[21] Appl. No.: 40,029

[22] Filed: Apr. 20, 1987

[51] Int. Cl.$^4$ .............................................. G09B 3/00
[52] U.S. Cl. .................................. 434/330; 434/340; 434/344; 434/327
[58] Field of Search ............... 434/327, 330, 333, 335, 434/338, 339, 340, 344; 273/239

[56] References Cited

U.S. PATENT DOCUMENTS

| | | | |
|---|---|---|---|
| 2,673,404 | 3/1954 | Abrahamson | 434/338 |
| 3,015,895 | 1/1962 | Stall | 434/330 |
| 3,070,904 | 1/1963 | Saba | 434/338 |
| 3,645,013 | 2/1972 | Takeuchi | 434/340 |
| 3,736,671 | 6/1973 | Oleinick | 434/338 |
| 4,268,978 | 5/1981 | Houn | 434/330 |
| 4,280,809 | 7/1981 | Greenberg et al. | 434/338 |
| 4,609,356 | 9/1986 | Gilden | 434/330 |

Primary Examiner—Richard J. Apley
Assistant Examiner—J. Welsh
Attorney, Agent, or Firm—Edward A. Gordon

[57] ABSTRACT

An educational device adapted to use interchangeable card members having comparable informational indicia thereon is provided comprising a casing having interchangeable dielectric panel members having upper and lower surfaces removably secured to the casing. A plurality of pairs of normally open electric current paths are associated with the lower surface of the panel member, each of the current paths having a pair of normally open magnetic switches thereby forming a corresponding pair of magnetic switches. A source of electrical energy is connected to the open electric current paths operative when activated to provide a sensurous indication when a corresponding pair of normally open switches is closed. The interchangeable card members which are supported on the dielectric panel members have an upper indicia bearing surface comprising a first section having a plurality of informational indicia thereon and a second section having a plurality of informational indicia thereon, whereby each of the indicia of the first section has a related indicia in the second section to thereby form pairs of comparable indicia. A pair of manipulatable magnetic selector members are provided to close the normally open pairs of magnetic switches when positioned on the indicia bearing surface adjacent to the magnetic switches. When a pair of magnetic selector members are moved over the indicia bearing surface to a correct selection of a pair of comparable indicia, the associated pair of magnetic switches are closed to thereby activate the indicating member.

11 Claims, 3 Drawing Sheets

EDUCATIONAL DEVICE

FIELD OF THE INVENTION

The present invention relates to a manually operable teaching machine which permits the operator of the machine to teach and instruct himself. More particularly, the invention is directed to a teaching machine whereby the operator or pupil may select a question and then choose the appropriate answer from a group of possible answers. The invention also provides a device whereby the operator or pupil can utilize the concept of matching words, symbols, numbers or the like with a minimum of verbal directions from a teacher. If the answer or match selected is correct, such will automatically be indicated to the pupil by a suitable indicator.

BACKGROUND OF THE INVENTION

Different types of teaching machines in general adopt what is known as the dialogical method or the question-and-answer system for the study processes. Popular dialogical methods now in use are the method of choice and the method of paired association. The former is the system of selecting an answer for a given question from among an answer group while the latter is the system of reproducing correct and corresponding paired relationships from randomly orientated pairs of related information.

The prior art is redundant with teaching devices and the like which utilize the infallible correctness of electrical circuitry as related to comparable information and which operate lights and/or alarms that signal a correct comparison. Such devices use one or more electrical probes through which electrical continuity is established by selecting and touching correctly related electric contacts associated with the comparable information.

The following U.S. patents are exemplary of such prior art devices. In U.S. Pat. No. 3,057,082 to Wellington, et al, there is disclosed a test scoring, recording and teaching apparatus that includes counters, signal means, a printed circuit board, a probe, and a puncturable sheet. In U.S. Pat. No. 3,141,244 to Smith, there is disclosed an audio-visual teaching device that includes a control unit, a sheet of puncturable material, a sheet of non-conductive material, a probe, and circuit means. Schure, et al in U.S. Pat. No. 3,579,864 discloses a teaching device that includes a multiple leaf answer response sheet, card, lamps, housing and matrix. In prior U.S. Pat. No. 3,662,078 to Holiday there is disclosed a soft teaching machine that includes a recording and presenting means, means for advancing the recording and presenting means, displaying means and probe means. U.S. Pat. No. 2,673,404 discloses a magnetic game apparatus in which the gameboard is provided with iron pieces in either fixed or changeable locations, a movable game piece having a magnetizable element and an electric circuit operable when the game piece is brought into contact with the iron pieces to thereby activate an electric signal.

Although the prior art devices are generally satisfactory for their intended purposes, they generally still necessitate the use of one or more electrical probes through which electrical continuity is established by selecting and touching correctly related electrical contacts associated with the comparable information. Such devices are characterized by a board having a plurality of holes and a sheet or cover disposed over the board and having the comparable information disposed thereon. The cover or sheet may be provided with holes which must be in register with the corresponding holes on the board. The user is then required to manipulate the probes so that they perforate the sheet, or in the case of a cover, the hole therein, and pass through the corresponding holes in the board to make electrical contact to produce an output. Such prior art devices are of a disadvantage not only due to the complexity of the probe requirements, but also where the dexterity or intelligence of the user is not yet sufficiently developed to manipulate the probes. Accordingly, there is still a great need to provide an educational device which overcomes the disadvantages of the prior art.

Accordingly, a general desirable object of the present invention is to provide an educational device which overcomes these disadvantages of the prior art devices.

Another desirable object of the present invention is to provide a teaching or educational device having a plurality of informational cards whereon the positional relationship between the correlated indicia may be varied between the various training or informational cards.

Another desirable object of the present invention is to provide an educational device having a plurality of normally open electric current paths each connected to an indicator and which are selectively closed by user in relation to a training or information card without the need of manipulating one or more electrical probes to establish electrical continuity.

Other desirable objects and advantages of the present invention will in part appear hereinafter and will in part become apparent after consideration of the specification with reference to the accompanying drawings.

SUMMARY OF THE INVENTION

The present invention discloses an educational or teaching device which broadly is directed to the method of paired association. In accordance with the present invention the educational device comprises a housing or cabinet having a top supporting surface member adapted to releasably hold in alignment informational or training cards having indicia thereon representative of pairs of affairs in definite relationship (for example, matching questions and answers, words, symbols, numbers, a group of questioned formula for arithmetic calculations and a group of corresponding answers, and the like). Positioned within the cabinet and adjacent the under surface of the top surface member are a plurality of pairs of normally open electric current paths which are connected to a power source and a sensuous signal means such as a light, buzzer and the like which is activated when the correct pairs of current paths are selected by the user in cooperation with the informational cards. The normally open electric current paths have two normally open magnetic switches which correspond to the correlated pairs of indicia. The educational device includes a pair of manipulatable magnetic members adapted to be placed upon and/or moved about the surface of the informational or training cards and whereby when an intelligent selection of comparable or matching information is selected, it is accompanied by a correct closing of the associated magnetic switches of the correct pair of current paths whereby the circuit is closed and the sensuous signal activated to affirm that the correct comparable information has been selected.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF PREFERRED EMBODIMENTS

Figure 1:
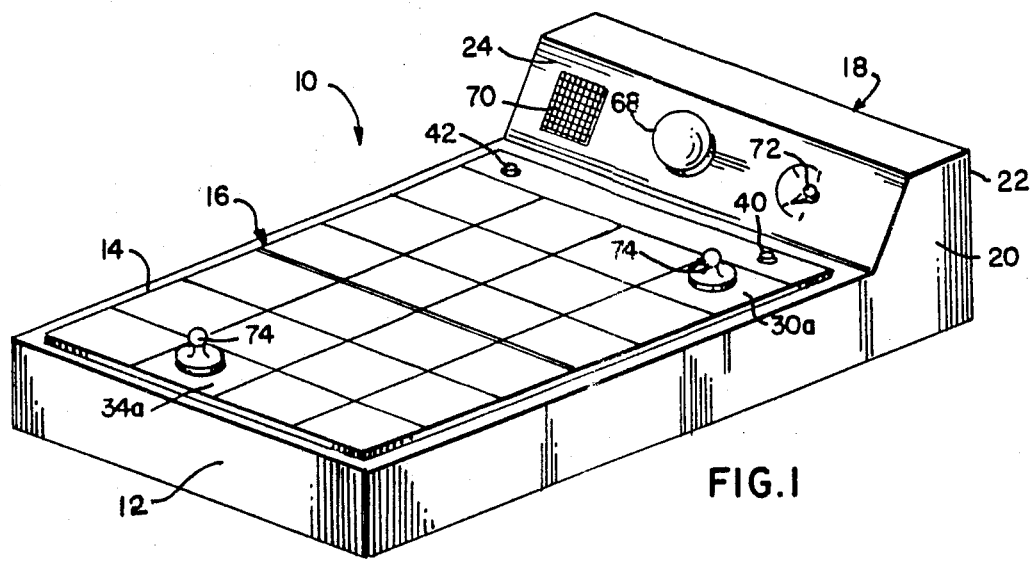
FIG. 1 is a perspective view of the educational device of the present invention showing the informational card in its operating position and a pair of information selector pieces in position for one possible selection of comparable information.
Figure 2:
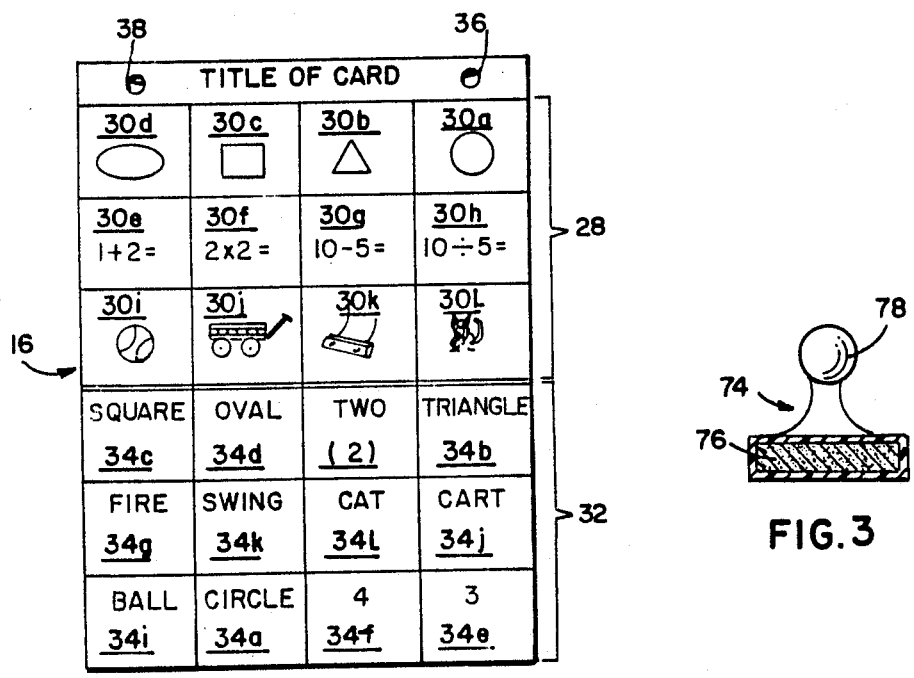
FIG. 2 is a top elevation view of one embodiment of an
informational card usable with the educational device of the present invention.
Figure 3:
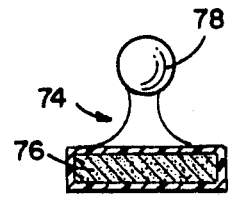
FIG. 3 is a cross-section view of one embodiment of an information selector piece for use with the educational device of the present invention.

Referring now to the drawings and particularly to FIGS. 1-3, the reference numeral 10 indicates generally the educational device of the present invention which comprises a casing or cabinet 12 which contains the electric circuitry hereinafter described. The casing 12 is provided with a top panel member 14 having a top surface 13 for releasably receiving and holding an informational card or sheet 16. The top panel member 14 is releasably attached to the casing 12 by conventional attaching means such as, for example, screws or clamps (not shown). The top panel member can be formed of an electrically non-conducting or dielectric material such as, for example, plastic. The casing 12 has a housing 18 at one end which include a pair of opposed side walls 20, a rear wall 22, and a front wall 24. The front wall is preferably inclined to enhance viewing of the sensuous indicator means such as light means 68.

The informational card 16 includes two sections of comparable or matching information. The upper section 28 includes a plurality of informational indicia such as numbers, symbols, words which may be referred to as the question or problem section. The lower section 32 which may be referred to as the answer section includes a plurality of informational indicia which relates or is comparable to the informational indicia in the upper section 28.

As can be seen, the card 16, for example, includes twelve areas of indicia 30a–L disposed in the upper question section 28 and twelve areas of indicia 34a–L in the answer section 32. Each indicia in the upper question section 28 has a matching or comparable indicia in the answer section 32. For example, the indicia 30a, the circle in the question section 28 has a matching or comparable indicia 34a, the word "circle", in the answer section. Other comparable pairs such as 30e–34e, 30j–34j, can be readily appreciated. Additionally, although twelve questions and answers are illustrated, it may be appreciated that any number of questions and answers could be provided on any card. Also questions having multiple choice answers could also be provided. Also it is appreciated that location of questions and more especially answers are located in different positions and in different order from top to bottom as well as from side to side so that there will not be any repetition which could be relied on for obtaining correct answers and so the full intellect of the user is tested.

In order to obtain the proper orientation of the card 16 on the top surface 13 of panel 14, each card is provided with positioning or orientation holes or apertures 36 and 38 which are adapted to respectively fit in register with positioning or orientation pins 40 and 42 as will be discussed in more detail hereinafter.

Figure 4:
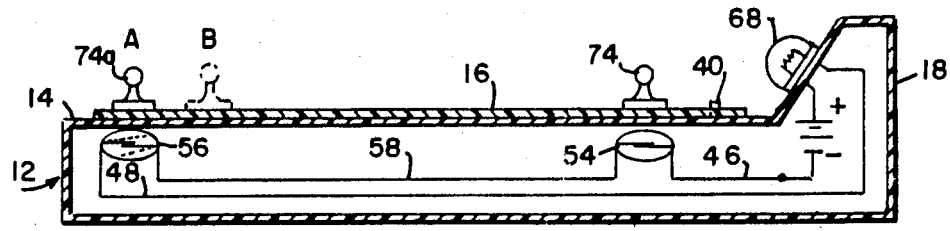
FIG. 4 is an enlarged schematic cross-sectional view of one embodiment of the magnetic switching mechanism of the present invention.
Figure 5:
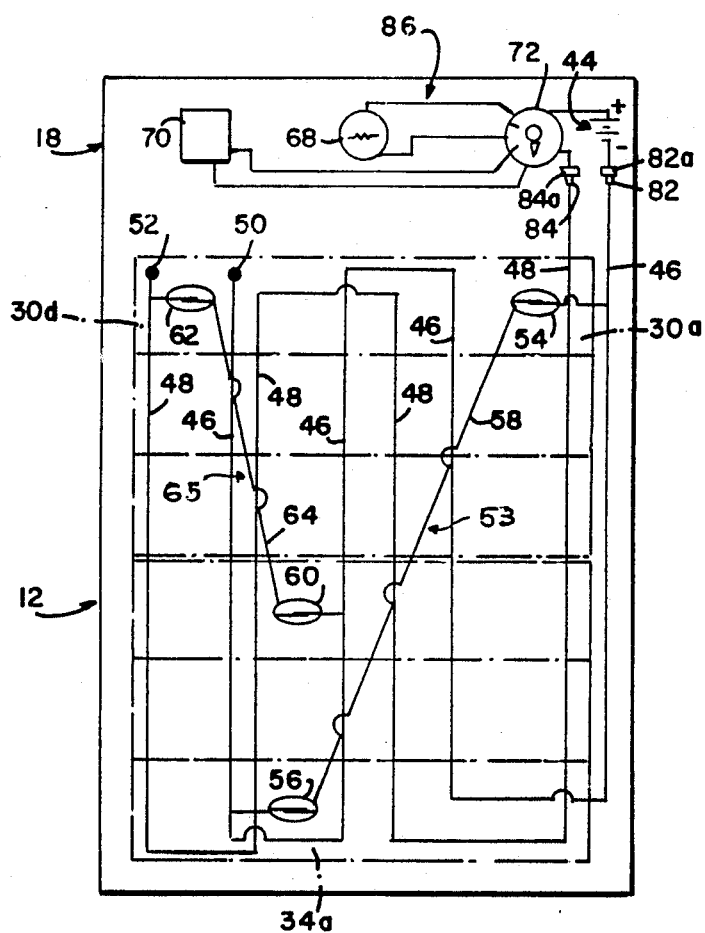
FIG. 5 is a schematic representation of an electric circuit used in the present invention.

Referring now more particularly to FIGS. 4 and 5, there is shown a schematic representative of an electric circuit used in the present invention. The circuit includes a source of power 44, for example, a dry cell, a first conductor 46 connected to the negative terminal of the power source 44 and a second conductor 48 connected to the positive terminal of the power source 44. The ends 50 and 52 of respective conductors 46 and 48 are maintained in a spaced non-conducting relationship. The circuit further includes a plurality of pairs of normally open electric current paths. For simplicity of description and illustration, only two pairs of normally open electric current paths are shown although it is to be understood that the circuit is not so limited. Referring again to FIGS. 4 and 5, a normally open electric current path, generally shown at 53, comprises, for example, a normally open switch means 54 electrically connected to conductor 46, normally open switch means 56 electrically connected to conductor 48, and conductor 58 connecting switch means 54 and 56. Switch means 60 and 62 and conductor 64 form a normally open electric current path, generally at 65, in the same manner as illustrated at 53. The circuit also includes a light means 68, a lamp for example, an audio means 70, for example a musical buzzer, and a multiple contact switch 72, which is preferably constructed and arranged to open and close the circuit and activate the lamp 68 and buzzer 70 simultaneously or individually as is well known in the art. The normally open switch means 54,56, 60 and 62 are preferably of the type that are normally open and which may be temporarily closed and opened by non-conductive relatively remote means. One suitable type of such switch means is one which is activated, closed, when subjected to a magnetic field. For example, a reed switch relay is one such suitable type having a pair of closely spaced witch contacts which are normally open and which will close and conduct electrically when subjected to a magnetic field such as produced by a bar magnet. In accordance with the present invention a manipulatable selector means 74 (as best seen in FIGS. 3 and 5) comprising a magnetic field source 76, for example, a bar magnet (permanent magnet), enclosed in a dielectric material such as plastic having an upper finger grip portion 78 to facilitate manipulation of the selector means.

Referring again to FIGS. 4 and 5, it can be appreciated that when a pair of selector means 74 are positioned above magnetic switches 54 and 56 the switches are closed (activated) thereby completing the circuit between conductors 46 and 48 and activating the light 68 and/or buzzer 70. In order to facilitate understanding of the operation of the educational device, the information card 16 of FIGS. 1 and 2 has been superimposed on FIG. 5 by the dotted lines.

In operation the user for example, places a selector in the upper informational area 30a having indicia of a circle. At this point the magnetic selector 74 closes the magnetic switch 54 positioned adjacent the under surface of panel 14. The user then selects an informational section in the lower section 32 of the card 16 which answers or matches the question selected in the upper section. When the user selects comparable indicia, that is indicia of section 34a by placing a second selector 74 on the section as shown, the corresponding magnetic switch 56 is activated (closed) and circuit closed and the correct selection affirmed by the activation of the light 68 and/or buzzer 70. If the user selects any other indicia in section 32, the circuit will not be closed nor the light and/or buzzer activated thereby indicating an incorrect answer. For example, as shown in FIG. 4, when the selector 74a is in the position B (dotted lines) the magnetic switch 56 is open (as shown by the dotted lines). When the selector 74a is moved to position A the magnetic field created by selector 74a closes the magnetic switch 56 to thereby close the circuit and activate the lamp 68.

Figure 6:
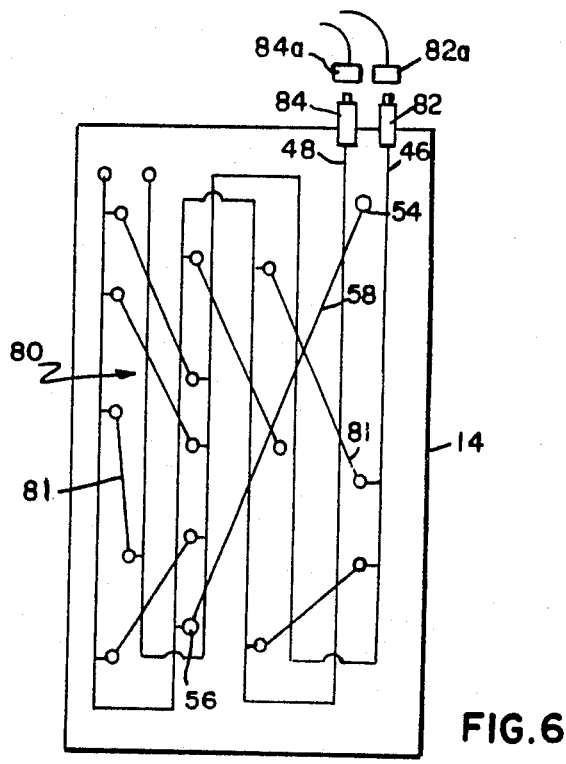
FIG. 6 is a plan view of the back face of the top panel of the casing of the educational device of FIG. 1.

Referring now to FIG. 6, an electric circuit of the type illustrated in FIG. 5 represented generally by the numeral 80 is positioned on the back face 15 of the top panel 14 and includes conductors 46 and 48 and a plurality of normally open electric current paths 81 as discussed with respect to FIGS. 4 and 5. The circuit 80 positioned adjacent the back surface 15 of panel 14 is provided with male terminals 82 and 84 for electrical connection with corresponding female receptacles 82a and 84a (see also FIG. 5) whereby the circuit panel is connected (plugged in) to the housing circuit shown generally at 86 of FIG. 5 containing the power source 44, switch 72, light means 68, audio means 70 and associated conductors. It can be appreciated that a plurality of circuit panels may be provided in accordance with the invention whereby the panel has an array of current paths 81 which are different from each other. It is also to be understood that each circuit panel is provided with one or more associated informational cards which are provided with question and answer sections which correspond to normally open electric current paths. Additionally, it can be appreciated that the educational cards of the present invention may be provided with informational indicia on both sides to provide a reversible card.

Figure 7:
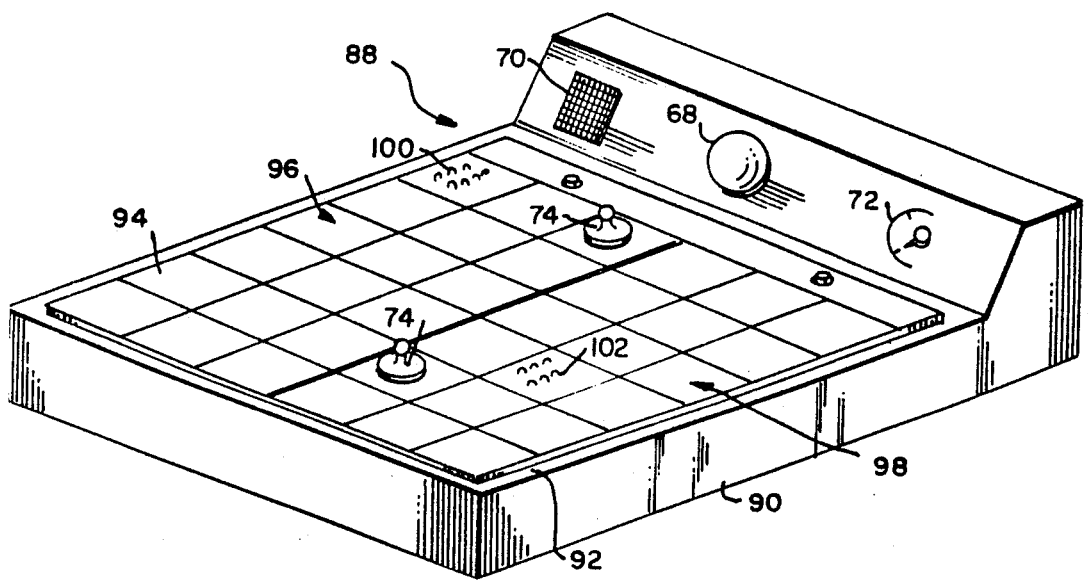
FIG. 7 is a perspective view of another embodiment of the educational device of the present invention.

Referring now to FIG. 7, there is illustrated generally at 88 another embodiment of the educational device of the present invention. This embodiment is similar to the educational device of FIG. 1 except that the casing 90, top panel 92 and informational card 94 are configured to have a width greater than the length to simulate the configuration of an open book. In this embodiment the informational card 94 is provided with a question section 96 on the left and a corresponding answer section 98 on the right. Additionally, as illustrated in FIG. 7, the informational cards may be provided with questions 100 and answers 102 in braille whereby a blind user, employing the audio signal feature of the educational device, can easily operate the educational device.

From the foregoing, it will be appreciated that the educational device of the present invention overcomes the disadvantages of the prior art devices and provides a device having an uncomplicated construction and which is especially easy to use and therefore adaptable to users of all age groups.

While the invention has been described with respect to preferred embodiments it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in a limiting sense.

I claim:

1. An educational device adapted to use interchangeable card members having comparable informational indicia thereon comprising:
   means forming a casing;
   a top dielectric panel member having upper and lower surfaces removably secured to said casing;
   a plurality of pairs of normally open electric current paths associated with the lower surface of said panel member, each of said current paths having a normally open magnetic switch means thereby forming a corresponding pair of magnetic switch means;
   a source of electrical energy connected to said open electric current paths;
   indicating means electrically connected to said pairs of current paths operative when activated to provide a sensurous indication when a corresponding pair of said normally open switch means is closed;
   said interchangeable card members adapted to be positioned on the upper surface of said panel member and having an upper indicia bearing surface comprising a first section having a plurality of informational indicia thereon and a second section having a plurality of informational indicia thereon, each of said indicia of said first section having a related indicia in said second section to thereby form pairs of comparable indicia; and
   a pair of manipulatable magnetic selector means constructed and arranged to close said normally open magnetic switch means when positioned on said indicia bearing surface adjacent said magnetic switch means;
   said pair of magnetic selector means being movable over the indicia bearing surface whereby an intelligent selection of a pair of said comparable indicia accompanied by a correct positioning of said selector means adjacent the associated pair of magnetic switch means closes said magnetic switch means and activates said indicating means.

2. The educational device in accordance with claim 1 wherein said indicating means can be selectively audible or visual.

3. The educational device in accordance with claim 1 including means for releasably orienting said cards on the upper surface of said panel member whereby pairs of comparable indicia are aligned with pairs of corresponding switch means.

4. The educational device in accordance with claim 1 wherein said dielectric panel member and associated electric current paths can be replaced with a panel member having different associated electric current paths corresponding to the informational indicia on the informational card being used.

5. The educational device in accordance with claim 1 wherein said source of electrical energy comprises a battery disposed within said casing.

6. The educational device in accordance with claim 1 wherein said magnetic selector means comprises a permanent magnet means.

7. The educational device in accordance with claim 6 further comprising a dielectric grip associated with said magnet means.

8. The educational device in accordance with claim 1 further comprising pin means on the upper surface of said dielectric panel member coacting with aperture means on said interchangeable changeable card members for orienting said card members to provide proper registry of the comparable indicia thereon with pairs of corresponding switch means on the lower surface of said panel member.

9. The educational device of claim 1 wherein said interchangeable card members are reversible and have a plurality of informational indicia on each side.

10. The educational device in accordance with claim 1 wherein said informational indicia upon the surface of said interchangeable card members is in the form of braille.

11. An educational device adapted to use interchangeable card members having comparable informational indicia thereon comprising:
- means forming a casing;
- a top dielectric panel member having upper and lower surfaces removably secured to said casing;
- a plurality of pairs of normally open electric current paths associated with the lower surface of said panel member, each of said current paths having a normally open magnetizable switch means thereby forming a corresponding pair of magnetizable switch means;
- a source of electric energy connected to said pairs of normally open electric current paths;
- indicating means electrically connected to said pairs of current paths operative when activated to provide a sensurous indication when a corresponding pair of said normally open magnetizable switch means is closed;
- said interchangeable card members having an upper indicia bearing surface comprising a first section having a plurality of informational indicia thereon and a second section having a plurality of informational indicia thereon, each of said indicia of said first section having a related indicia in said second section to thereby form pairs of comparable indicia;
- means for releasably orienting said cards on the upper surface of said panel member whereby pairs of comparable indicia are aligned with pairs of corresponding switch means; and
- a pair of magnetic selector means manipulable over the indicia bearing surface of said interchangeable card members constructed and arranged to close said normally open magnetizable switch means when positioned on said indicia bearing surface adjacent said magnetizable switch means;
- said pair of magnetic selector means being movable over the indicia bearing surface whereby an intelligent selection of a pair of said comparable indicia accompanied by a correct positioning of said selector means adjacent the associated pair of magnetizable switch means closes said magnetizable switch means and activates said indicating means.

* * * * *